United States Patent
Allegar et al.

(10) Patent No.: US 10,768,325 B2
(45) Date of Patent: Sep. 8, 2020

(54) METHOD TO ESTIMATE 4D SEISMIC ACQUISITION REPEATABILITY SPECIFICATIONS FROM HIGH-RESOLUTION NEAR-WATER-BOTTOM SEISMIC IMAGES

(71) Applicants: Norman C. Allegar, Houston, TX (US); John E. Anderson, Conroe, TX (US); Simon Dewing, Spring, TX (US)

(72) Inventors: Norman C. Allegar, Houston, TX (US); John E. Anderson, Conroe, TX (US); Simon Dewing, Spring, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 418 days.

(21) Appl. No.: 15/722,638

(22) Filed: Oct. 2, 2017

(65) Prior Publication Data

US 2018/0120461 A1    May 3, 2018

Related U.S. Application Data

(60) Provisional application No. 62/413,619, filed on Oct. 27, 2016.

(51) Int. Cl.
*G01V 1/30* (2006.01)
*G01V 1/38* (2006.01)

(52) U.S. Cl.
CPC ............ *G01V 1/308* (2013.01); *G01V 1/3817* (2013.01); *G01V 1/38* (2013.01); *G01V 2210/612* (2013.01); *G01V 2210/614* (2013.01); *G01V 2210/6161* (2013.01); *G01V 2210/626* (2013.01)

(58) Field of Classification Search
CPC ....................................................... G01V 1/308
USPC .............................................................. 702/16
See application file for complete search history.

(56) References Cited

U.S. PATENT DOCUMENTS

| | | | |
|---|---|---|---|
| 3,893,539 A | 7/1975 | Mott-Smith |
| 4,476,550 A | 10/1984 | Ziolkowski |
| 4,693,336 A | 9/1987 | Newman |
| 4,827,456 A | 5/1989 | Brac |

(Continued)

OTHER PUBLICATIONS

Baumstein A. et al. (2010) "Accurate data reconstruction through simultaneous application of statistical and physics-based constraints to multiple geophysical data sets" Geophysics, 75(6), pp. WB165-WB172.

(Continued)

*Primary Examiner* — Ricky Ngon
(74) *Attorney, Agent, or Firm* — ExxonMobil Upstream Research Company—Law Department

(57) ABSTRACT

A method for designing 4-D seismic acquisition source and receiver repeatability specifications, the method including: locating, with a computer subsurface anomalies above a target reservoir zone from analysis of high-resolution reflectivity images for the target reservoir zone; determining, with a computer, how the anomalies above the target reservoir zone modify target illumination for variations in the 4-D seismic acquisition source and receiver positions; and determining, with a computer, repeatability specifications for a monitor seismic survey, wherein tolerances for the source or receiver positions varies across an acquisition area based on how the anomalies modify the target illumination.

7 Claims, 8 Drawing Sheets

(56) References Cited

U.S. PATENT DOCUMENTS

| | | | |
|---|---|---|---|
| 4,868,794 | A | 9/1989 | Ziolkowski et al. |
| 7,218,572 | B2 | 5/2007 | Parkes |
| 7,440,357 | B2 | 10/2008 | Hopperstad |
| 7,539,079 | B2 | 5/2009 | Hoogeveen et al. |
| 8,352,190 | B2 | 1/2013 | Baumstein et al. |
| 8,467,264 | B2 | 6/2013 | Keers et al. |
| 8,605,551 | B2 | 12/2013 | Hopperstad |
| 8,687,462 | B2 | 4/2014 | Hopperstad |
| 8,917,573 | B2 | 12/2014 | Yang et al. |
| 8,958,266 | B2 | 2/2015 | Kragh et al. |
| 8,964,502 | B2 | 2/2015 | Norris |
| 2008/0175102 | A1 | 7/2008 | Hegna et al. |
| 2009/0073804 | A1 | 3/2009 | Laws et al. |
| 2012/0072115 | A1 | 3/2012 | Laws |
| 2013/0279291 | A1 | 10/2013 | Keers et al. |
| 2014/0165694 | A1* | 6/2014 | Bousquie ............ G01V 1/3808 73/1.85 |
| 2014/0297190 | A1* | 10/2014 | Svay ................. G01V 13/00 702/16 |
| 2015/0234071 | A1 | 8/2015 | Hegna |
| 2016/0320506 | A1* | 11/2016 | Almuhaidib .......... G01V 1/282 |
| 2017/0269246 | A1 | 9/2017 | Anderson et al. |

OTHER PUBLICATIONS

Brink, M., et al. (1999) "The value of near field hydrophone measurements for monitoring source signature variations", EAGE 61st Conference and Technical Exhibition—Helsinki, Finland, Jun. 7-11, 1999; Session 6-09, 4 pages.

Cantillo, J. (2012) "Throwing a new light on time-lapse technology, metrics and 4D repeatability with SDR": Marine and Seabed Technology, The Leading Edge, Apr. 2012; 31, 405-413.

Dragoset, B. (2000), "Introduction to air guns and air-gun arrays": The Leading Edge, vol. 19, Issue 8, 892-897.

Hopperstad, J. F., et al. (2006) "Source Signature Estimation-Attenuation of the Seafloor Reflection Error in Shallow Water" EAGE Expanded Abstract, 5 pages.

Johnston, D. H., et al. (1998) "Seismic time-lapse analysis of Fulmar field: The Leading Edge", 17, No. 10, 1420-1428.

Johnston, D. H., et al. (2000) "Using legacy seismic data in an integrated time-lapse study: Lena field, Gulf of Mexico": The Leading Edge, vol. 19, No. 3, 294-302.

Johnston, D. H., et al., (2012) "Resource assessment based on 4D seismic and inversion at Ringhorne field, Norwegian North Sea" The Leading Edge, vol. 31, No. 9, 1042-1048.

Johnston, D. H. (2013) "Practical Applications of Time-Lapse Seismic Data", SEG Distinguished Instructor Series No. 16, Society of Exploration Geophysicists; 289 pages.

Kragh, E., et al. (2000) "Source Signature Estimation—Attenuation of the sea-bottom reflection error from near-field measurements": EAGE Expanded abstract, vol. 18, Issue 6, Jun. 2000, pp. 260-264.

Kragh, E., et al. (2002) "Seismic repeatability, Normalized RMS, and Predictability": The Leading Edge, SEG Technical Program Expanded Abstracts 2001, pp. 1656-1659.

Lecerf, D. et al. (2015) "Repeatability measure for broadband 4D seismic", SEG Expanded Abstracts, pp. 5483-5487.

Ni, Y., (2014) "Joint inversion of near-field and far-field hydrophone data for source signature estimation" SEG Technical Program Expanded Abstracts: pp. 57-61.

Ni. Y., (2015) "Source signature estimation in shallow water surveys" SEG Technical Program Expanded Abstracts, pp. 71-75.

Niang, C., (2013) "Monitoring of Air-Gun Source Signature Directivity" SEG Technical Program Expanded Abstracts 2013, pp. 41-45.

Parkes, G. E., et al. (1984) "The signature of an airgun array: computation from near-field measurements including interactions—Practical considerations" Geophysics, vol. 49, Issue 2; 105-111.

Sheriff, R. E., et al. (1995). "Exploration Seismology" (2nd ed.). Cambridge University Press, ISBN 0-521-46826-4; Chapter 4, pp. 85-105.

Stammeijer, J.G.F., et al. (2014) "Standards in 4D feasibility and interpretation", The Leading Edge, vol. 33, Issue 2, pp. 134-140.

Wang, H. et al. (2016) "Uses of near-field hydrophone measurements for shallow-water imaging and demultiple", SEG Technical Program Expanded Abstract 2016; pp. 77-81.

Ziolkowski, A. et al. (1997) "Marine seismic sources: QC of wavefield computation from near-field pressure measurements" Geophysical Prospecting, vol. 45, Issue 4, pp. 611-639.

Ziolkowski, A., (1998) "Measurement of air-gun bubble oscillations" Geophysics, 63(6), 2009-2024.

\* cited by examiner

METHOD TO ESTIMATE 4D SEISMIC ACQUISITION REPEATABILITY SPECIFICATIONS FROM HIGH-RESOLUTION NEAR-WATER-BOTTOM SEISMIC IMAGES

RELATED APPLICATIONS

The present application includes subject matter related to U.S. provisional patent application 62/413,619, filed Oct. 27, 2016 entitled METHOD TO ESTIMATE 4D SEISMIC ACQUISITION REPEATABILITY SPECIFICATIONS FROM HIGH-RESOLUTION NEAR-WATER-BOTTOM SEISMIC IMAGES, the entirety of which is hereby incorporated by reference.

FIELD OF THE INVENTION

Exemplary embodiments described herein generally pertain to the field of geophysical prospecting and, more particularly, to marine seismic surveying and processing of the measured data.

BACKGROUND

This section is intended to introduce various aspects of the art, which may be associated with exemplary embodiments of the present technological advancement. This discussion is believed to assist in providing a framework to facilitate a better understanding of particular aspects of the present technological advancement. Accordingly, it should be understood that this section should be read in this light, and not necessarily as admissions of prior art.

The 4D seismic interpretation method notes the differences in the images or seismic processing products created from seismic data acquired at different times. For example, an initial seismic survey, often referred to as the base survey, might be recorded prior to any hydrocarbon production, then a period of years pass during which hydrocarbons are produced, and then a subsequent monitor seismic survey is recorded. The subsurface seismic reflectivity can change between these two seismic surveys. These differences are typically interpreted to be due to changes in fluid content and pressure in the hydrocarbon reservoir and are used to estimate which parts of the reservoir have been produced and which parts might be produced more efficiently by a different well pattern or fluid injection method. Exemplary discussions of 4D interpretation technology are explained by David H. Johnston (2013) in a tutorial text. Other exemplary discussions of 4D interpretation are found in David H. Johnston (1998, 2000, 2012) and by J. G. F. Stammeijer (2014).

The planning of marine seismic acquisition programs for 4D seismic interpretation can include a definition of repeatability specifications for source and receiver positions to ensure that the target reservoir zone is illuminated consistently between two or more seismic acquisition programs acquired at different times. Differences between seismic images from monitor and base surveys can be due to either differences in the seismic acquisition or differences in earth properties. A primary goal of 4D seismic acquisition design is to minimize the differences due to seismic acquisition so that the differences in the resulting images can be interpreted as changes associated with the earth properties due to hydrocarbon production. A seismic source is defined to be repeatable if the first survey has a source at a specified location and the second survey has an equivalent source within a small spatial tolerance at the same location. The key parameters of interest for this discussion are shown in FIG. 1. FIG. 1 illustrates subsurface zone of interest 101, hydrocarbon reservoir target zone 102, which is to be illuminated by the source and receiver locations; an overburden subsurface anomaly that modifies illumination of the target zone 102 by either a source or receiver, source location 104 associated with the base (initial seismic survey prior to hydrocarbon production) seismic survey, source location 105 associated with the monitor (second seismic survey acquired after hydrocarbon production) survey, receiver location 106 associated with the base seismic survey, and receiver location 107 associated with the monitor seismic survey. The location, size, and medium contrast parameters of anomaly 103 impacts how the seismic acquisition geometry associated with source and receiver locations impacts the illumination of the target zone. Typical medium parameters that impact seismic wave propagation directly are p-wave velocity, shear-wave velocity, density, the Q parameter controlling attenuation and seismic anisotropy. Rock physics transforms are commonly used to translate other medium parameters such as lithology type, shale volume, porosity, and fluid content into the parameters described above. Local stress changes can also impact seismic anisotropy. The maximum allowed difference between the base and monitor survey source locations is a tolerance used to define source location repeatability specifications for 4D seismic acquisition. The maximum allowed difference between the base and monitor receiver locations is a tolerance used to define receiver location repeatability specifications for 4D seismic acquisition. Both repeatability measures (source and receiver) can be used to define the repeatability of each seismic trace associated with a source location and a receiver location. Likewise, a receiver is defined to be repeatable if the first survey has a receiver at a specified location and the second survey has an equivalent receiver within a small spatial tolerance at the same location. 4D seismic surveys can require that source and receiver pairs corresponding to recorded seismic data both are repeatable to within a specified spatial tolerance.

The expense associated with 4D seismic acquisition is dependent upon the size of the spatial tolerances allowed for source and receiver repeatability. If very tight repeatability specifications are required, crews doing seismic acquisition may take much longer and incur much higher expenses to collect the required data. Alternatively, looser repeatability specifications can result in faster data acquisition and lower expenses.

The magnitude of illumination disruptions due to overburden anomalies in the earth relative to a target reservoir zone depend roughly upon the contrast of an anomaly and the size of the anomaly expressed as a solid angle relative to rays emanating from a source or receiver that reach the target. Waves passing through an anomaly can have both timing and amplitude differences compared to waves that propagate through a more homogeneous background medium. Shallow anomalies tend to have large relative contrasts and are often large in terms of solid angles associated with source or receiver positions. The marine 4D seismic acquisition repeatability specifications can be relaxed somewhat if the subsurface near the water bottom has smoothly-varying geology devoid of localized anomalies, but must be very tightly honored if the subsurface near the water bottom has many or complicated anomalies.

Shallow heterogeneities are often the critical factor in determining the maximum allowable discrepancy between spatial locations of sources and receivers in base and monitor surveys. Compare the illumination disruptions of the same size anomalies in FIGS. 2 and 3. The shallow anomaly 103 in FIG. 2 covers a larger solid angle associated with the source illumination than the deeper anomaly 103 in FIG. 3, and therefore is more important for repeatability specifications. FIG. 4 shows how larger anomalies 103 cover a larger solid angle of illumination for a given source location. Larger anomalies also impact more source and receiver locations. FIG. 5 shows how the concerns described above for overburden anomalies with respect to source locations in FIGS. 1-4 also apply to receiver locations.

Conventional seismic streamer data typically do not sample the near surface in shallow water environments with sufficient resolution to evaluate the degree of near-surface heterogeneity. This is partially due to the large spatial gap between the air gun source array and the nearest hydrophones in the streamer cables. In locations with a shallow water bottom, this large distance between the air gun source and the nearest hydrophones in the streamer cables may be on the order of 100 m while the water bottom depth may be less than 50 m. In these situations, the streamer hydrophones do not record a pre-critical water bottom reflection and the shallow subsurface cannot be imaged with high resolution. These issues are discussed by Norris, 2010, and by Anderson et al, 2016. Their work provides examples of acquiring hydrophone data from receivers placed near each marine air gun source component (typically called near field hydrophone or NFH data), doing direct arrival and reflectivity separation, and creating high-resolution images of water bottom and near-water-bottom zones.

SUMMARY

A method for designing 4-D seismic acquisition source and receiver repeatability specifications, the method including: locating, with a computer subsurface anomalies above a target reservoir zone from analysis of high-resolution reflectivity images for the target reservoir zone; determining, with a computer, how the anomalies above the target reservoir zone modify target illumination for variations in the 4-D seismic acquisition source and receiver positions; and determining, with a computer, repeatability specifications for a monitor seismic survey, wherein tolerances for the source or receiver positions vary across an acquisition area based on how the anomalies modify the target illumination.

The method can further include: determining a size, location and contrast of the anomalies; and wherein the determining how the anomalies above the target reservoir zone modify target illumination includes estimating, from the size, location and contrast of the anomalies with respect to a surrounding medium, which areal source or receiver surface positions would be impacted by the anomalies, magnitude of reflectivity of the anomalies, magnitude of timing and amplitude differences for wave propagation through the anomalies compared to wave propagation away from the anomalies, and a solid angle illumination impairment range associated with the anomalies relative to the target reservoir zone.

In the method, the high-resolution reflectivity images can be derived from a site hazard survey.

In the method, the high-resolution reflectivity images can be derived from a combination of active and passive arrays of near field hydrophone data.

In the method, the high-resolution reflectivity images can be derived from small-offset data associated with variable reluctance transducer source placed near a head or tail of marine streamer cables and streamer receivers disposed near the variable reluctance transducer.

In the method, the determining repeatability specifications can include generating a sensitivity map associated with the anomalies via a computer simulation of an exploding simulated source at a target reflector in a reference earth model, with simulated receivers disposed at potential source and receiver locations, and the sensitivity map is generated from magnitude of spatial variations associated with timing and amplitude of the wave field at the source or receiver locations.

The method can further include conducting a monitor survey in accordance with the repeatability specifications.

A non-transitory computer readable storage medium encoded with instructions, which when executed by a computer causes the computer to implement a method for designing 4-D seismic acquisition source and receiver repeatability specifications, said method comprising: locating, with the computer subsurface anomalies above a target reservoir zone from analysis of high-resolution reflectivity images for the target reservoir zone; determining, with the computer, how the anomalies above the target reservoir zone modify target illumination for variations in the 4-D seismic acquisition source and receiver positions; and determining, with the computer, repeatability specifications for a monitor seismic survey, wherein tolerances for the source or receiver positions vary across an acquisition area based on how the anomalies modify the target illumination.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Planning programs for 4D seismic acquisition need to specify source and receiver position repeatability standards to ensure that a target reservoir zone is illuminated consistently between two or more time-lapse seismic acquisition programs. This is critical to ensure that differences between the two or more time-lapse data sets are due to changes in the earth at the reservoir rather than due to changes in the seismic acquisition parameters.

The repeatability standards are very critical if the shallow reflectivity near the water bottom varies strongly and rapidly. Tight repeatability standards result in high seismic acquisition costs. Looser repeatability standards result in lower seismic acquisition costs.

Figure 1:
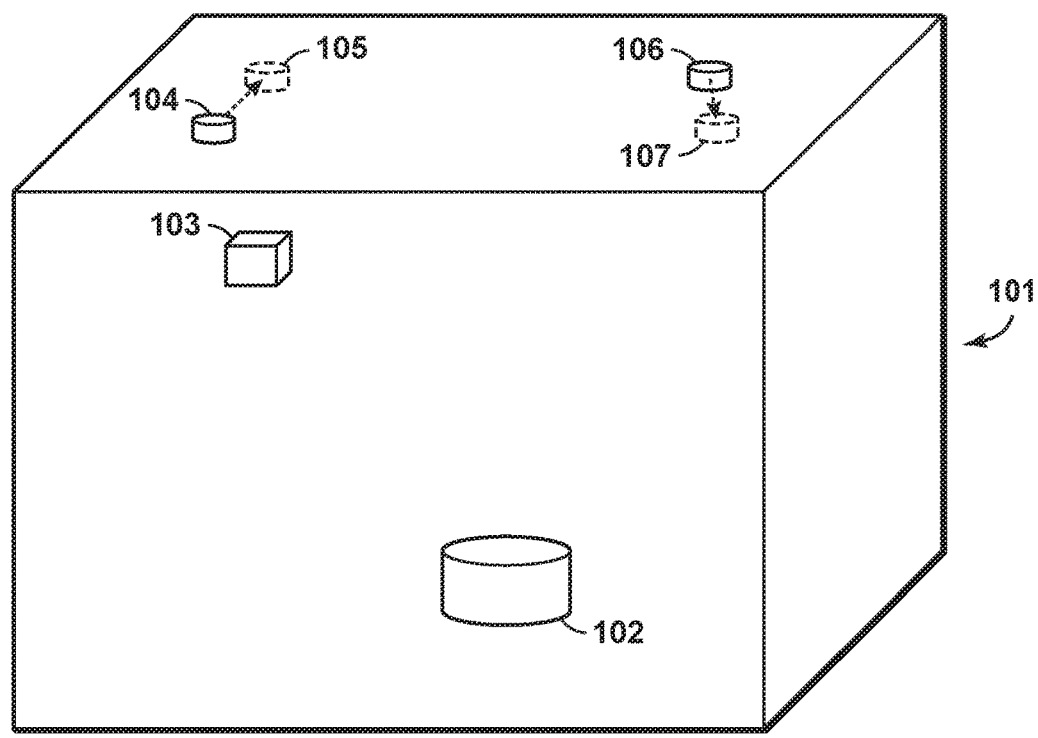
FIG. 1 illustrates receiver and source locations for a base and monitor survey.
Figure 2:
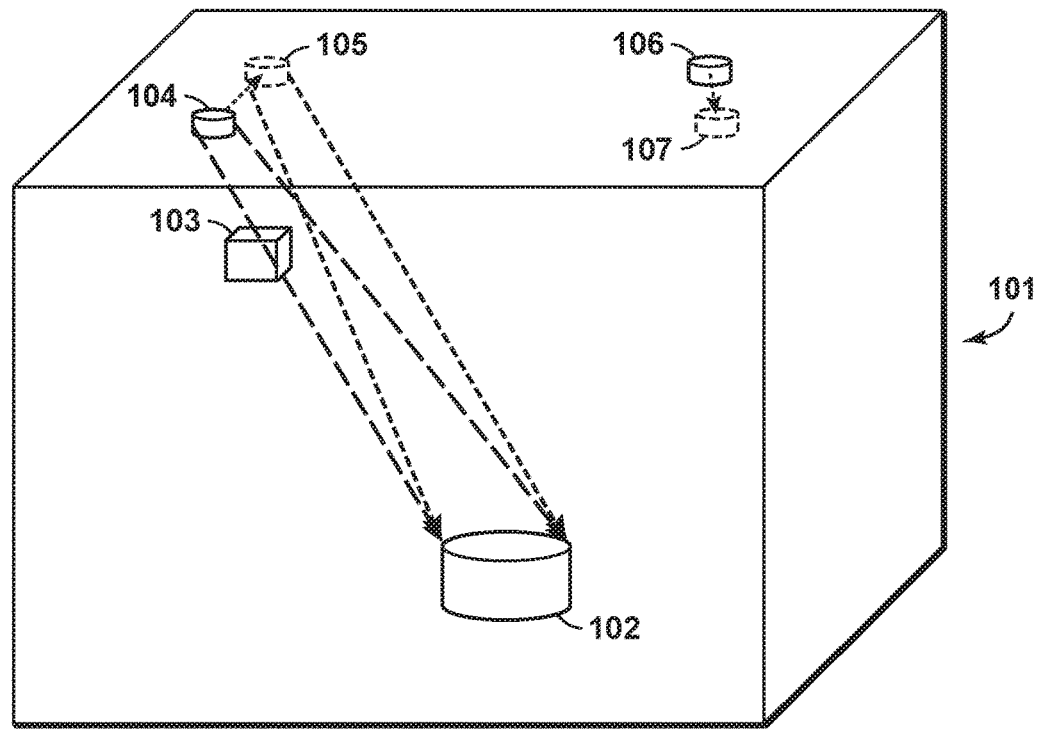
FIG. 2 illustrates how a small shallow anomaly can impact illumination of the target by the base survey source location.
Figure 3:
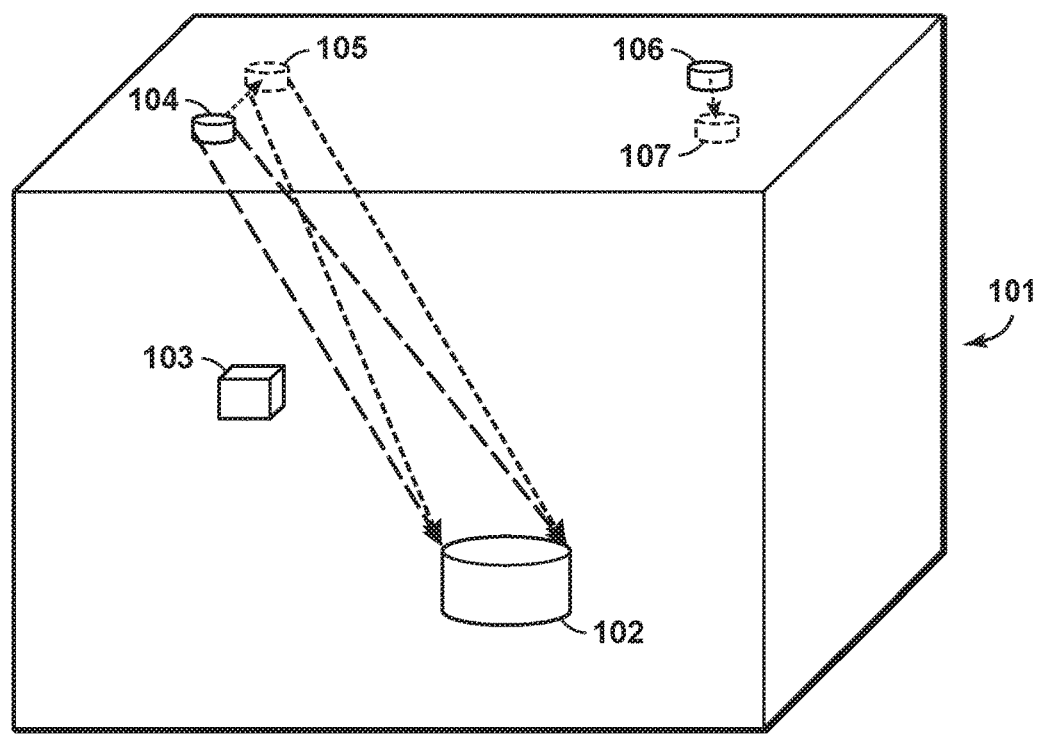
FIG. 3 illustrates how a small anomaly in a zone can cover a smaller solid angle of illumination from the source location.
Figure 4:
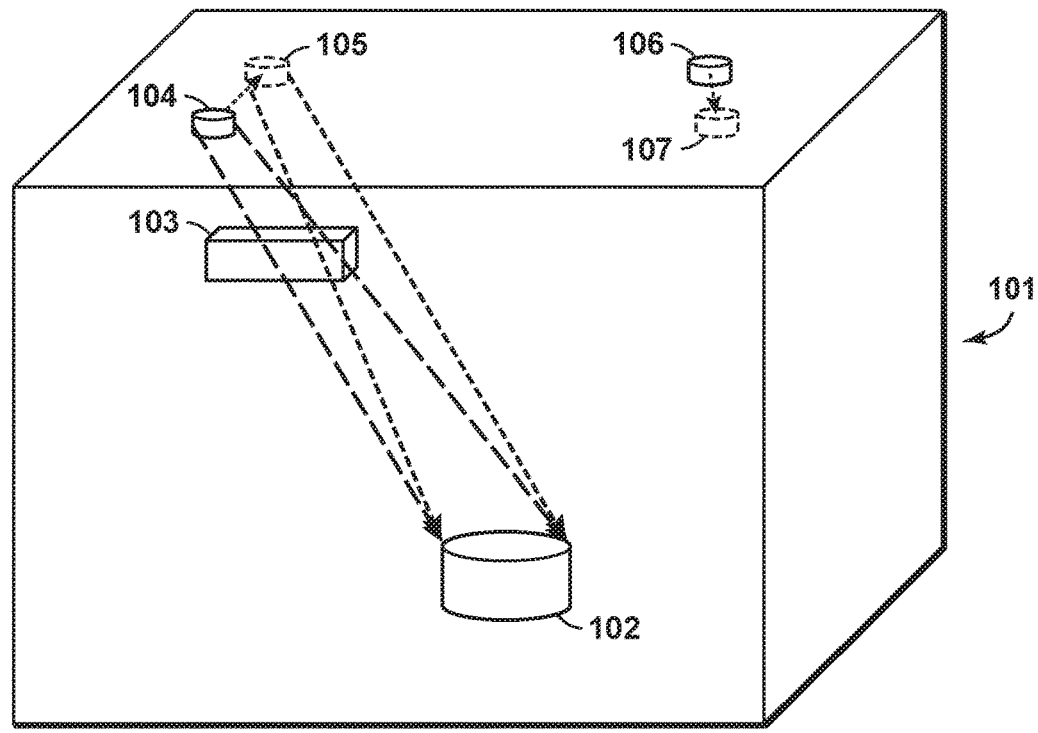
FIG. 4 illustrates how a larger shallow anomaly can have a bigger impact upon target illumination due to positioning differences of the seismic source.
Figure 5:
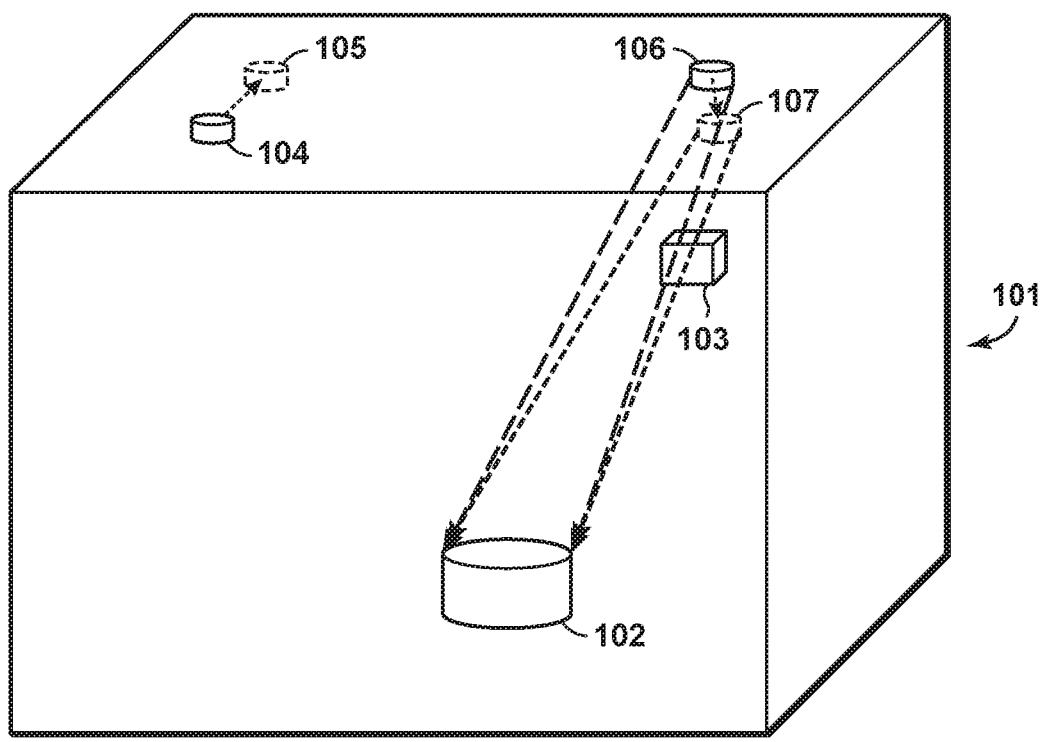
FIG. 5 illustrates how an overburden anomaly can also apply to the receiver positioning tolerances between the base and monitor surveys.
Figure 6:
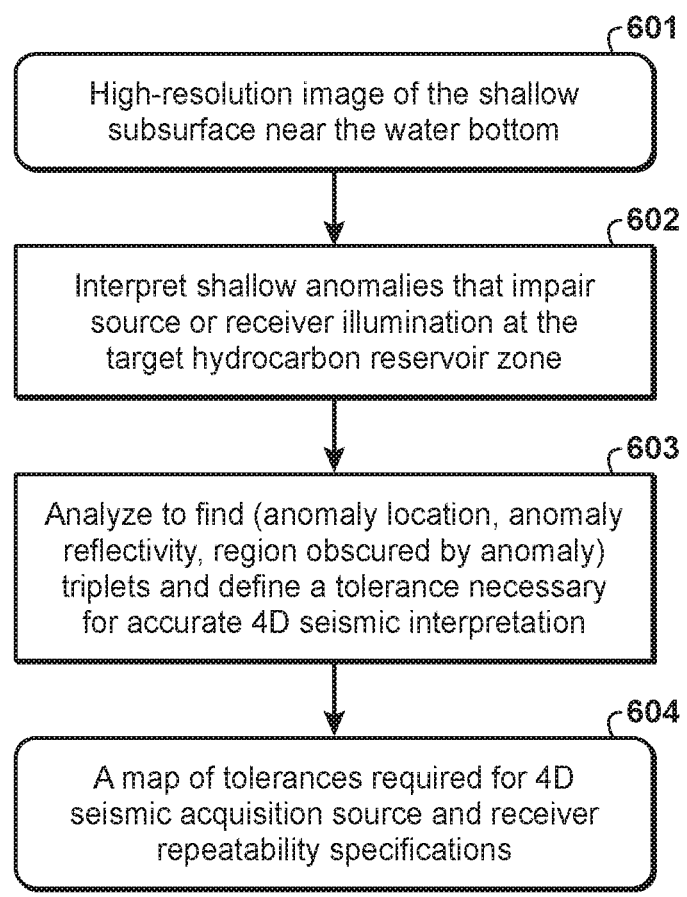
FIG. 6 illustrates an exemplary flow chart describing how to use high-resolution images of the earth near and below the water bottom to define a map of source and receiver repeatability requirements necessary for accurate 4D seismic interpretation.

The present technological advancement can include using high-resolution images of the earth, in particular the portion of the earth near the water bottom and near the source and receiver locations, to define subsurface anomalies that impair source or receiver illumination of a reservoir target. For each anomaly, the present technological advancement can define an areal illumination anomaly size and location, areal source or receiver surface positions whose illumination of the target are impacted by the anomaly, the anomaly reflectivity magnitude, and the solid angle illumination impairment range relative to the target. The interpreted information can then be built into seismic acquisition design for the repeatability specification required for source and receiver positioning. An exemplary method for the present technological advancement is illustrated in FIG. 6, and is further discussed below.

The present technological advancement can include a method for obtaining 4D seismic acquisition design repeatability standards for source and receiver positions between a base seismic survey and one or more monitor seismic surveys, the method including: estimating how the predicted quality of a 4D interpretation of subsurface hydrocarbon production is related to the impact of different tolerances for how closely time-lapse source and receiver positions must match; utilizing high-resolution images of the shallow subsurface near source and receiver locations; doing an analysis to understand how much shallow anomalies impair uniform seismic illumination of a hydrocarbon reservoir at depth in the subsurface; and preparing 4D seismic acquisition design repeatability standards.

A goal of the present technological advancement is to enable fit-for-purpose seismic data acquisition with tighter source and receiver position repeatability specifications for geology where the tighter specifications are needed, and looser specifications where such tight specifications are not needed. This can save costs over using the same tight standards everywhere. The present technological advancement can design 4-D seismic acquisition source and receiver repeatability specifications, wherein high-resolution reflectivity images are analyzed to understand geology above the target zone and tight 4-D repeatability specifications are chosen for a complicated subsurface with many high-contrast anomalies above the target that are found to modify target illumination for small variations in source or receiver positions while more relaxed and less costly 4-D repeatability specifications are chosen for more simple geology with few anomalies above the target that do not modify target illumination very much.

High-resolution site or hazard surveys are typically acquired prior to selecting a site where a well will be drilled. Two types of high-resolution data can be acquired at minimal extra cost and at the same time during standard marine streamer surveys. Near field hydrophone data comes from hydrophones placed near the seismic sources. The active array (the hydrophones near the guns that fire for a given shot record) and the passive array (the hydrophones near the guns that are not firing for a given shot record) provide data that can be used to make high-resolution shallow earth maps, as described in FIG. 7, using methods described by Anderson et al, 2016. Likewise, a relatively new source technology called the Bubble Gun, provides a small source that can be placed near the front or end of each marine streamer cable enabling high-resolution data useful for shallow imaging. Bubble Gun is the trade name for a variable reluctance transducer which is typically used as a low power, marine seismic source. It is also applicable to marine source arrays which combine multiple types or marine sources such as a combined source array containing air guns and Bubble Guns. These data can be used to make the images needed to define the repeatability standards desirable for 4D seismic acquisition at given location where prospecting for hydrocarbons is of interest.

Multiple types of data are useful as input to the present technological advancement described herein. Typically, one or more of the data types are available after the base seismic survey has been acquired and the first well has been sited. If prior 2D or 3D high-resolution surveys or prior 3D or 4D traditional seismic surveys are available, then they could be used. It is also possible to analyze data during the seismic acquisition and therefore modify the specifications as seismic acquisition progresses. It is very reasonable and practical to process the small amount NFH and/or cable head source data recorded during acquisition and then to use those results immediately. As computing capacity increases, even the traditional marine seismic data acquired can be processed and used immediately; enabling seismic acquisition design changes to accommodate new information.

The most commonly available high-resolution seismic data that can image the sea floor and the zone just beneath come from site survey data. These surveys are typically done to determine where to site a well and use broadband sources to find shallow hazards that might cause drilling or platform problems. These are often done with many very densely-spaced 2D profiles and short cables. Often, they only cover an area where potential well sites are proposed and do not cover the full spatial range of a traditional seismic survey. The sources, while broadband and supporting higher frequency content than found in standard marine seismic acquisition surveys, typically do not have sufficient energy to image very deep into the subsurface. These are able to identify incised channels, shallow gas zones, gas hydrate zones, and other shallow anomalies which are difficult to see clearly on traditional seismic data.

Near field hydrophone (NFH) data are recorded along sail lines near the source locations during a traditional marine survey. NFH data cover the same spatial area as the traditional marine survey. These can be processed into high-resolution volumes for near water bottom interpretation using methods described by Wang et al (2016). The NFH data are densely sampled along sail lines but poorly sampled between sail lines. These data do enable good insight into the character of shallow hazards over a large area, but have some limitations on defining details between sail lines. Therefore, NFH data do not fully supplant the need for site surveys. They do supply sufficient information for the purposes of the present technological advancement for defining 4D acquisition repeatability specifications. The data can be used to make a shallow earth model that has the right characteristics in a statistical sense, but that is not required to be fully accurate.

A third data type can be obtained from Bubble Gun sources. Bubble Gun sources can be placed near the head of each streamer cable. Data are recorded into both small-offset densely sampled arrays near the Bubble Gun source and into the marine streamer cables. This seismic acquisition design produces high-resolution data during the acquisition of a traditional marine survey and samples the shallow subsurface between sail lines much better than is done with NFH data.

A fourth data type can comes from the marine streamer data or the base seismic survey itself. These data are used to estimate background earth model properties such as velocity and are also used to identify the target reservoir zone. Typically these data do not have the resolution to image shallow hazards and shallow anomalies that may impact 4D repeatability standards.

FIG. 6 illustrates an exemplary flow chart describing how to use high-resolution images of the earth near and below the water bottom to define a map of source and receiver repeatability requirements necessary for accurate 4D seismic interpretation. In step 601, a high-resolution image is made from the high-resolution data. A high-resolution near-surface image can be derived from a site hazard survey, a combination of active and passive array near filed hydrophone data, or from small-offset data associated with a Bubble Gun source placed near the head or tail of each marine streamer cable and a combination of streamer receivers and optional additional receivers located near the Bubble Gun. In step 602, this high-resolution images are interpreted to define shallow anomalies that impair source and/or receiver illumination at the target hydrocarbon reservoir zone and to accurately position those anomalies. Step 603 can include analysis to find triplets (anomaly location, anomaly reflectivity, region obscured by anomaly) and define a tolerance necessary for accurate 4D seismic interpretation. Incised channels, shallow gas, gas hydrates, carbonate stringers, and other shallow anomalies can be defined and mapped in depth. Statistical characteristics of the anomaly distribution can be defined in space, but the exact details are not required to the same level of accuracy as required for siting a well. This characteristic enables the use of incomplete data. The lack of NFH data between sail lines is not a critical limitation. In addition, a background lower-resolution earth model can be made using the traditional seismic data. All of this information can be integrated together into an earth model.

In step 602, the size (e.g., areal anomaly size), location (e.g., depth), and contrast of each subsurface anomaly can be interpreted and used in step 603 to estimate the areal source or receiver surface positions that could be impacted by the anomaly, the magnitude of the anomaly reflectivity, the magnitude of timing and amplitude differences for wave propagation through the anomaly compared to wave propagation away from the anomaly, and the solid angle illumination impairment range associated with the anomaly relative to the target for use in calculation of a 4D repeatability measure for source and receiver locations.

In step 604, a sensitivity map can be created, which can be associated with the interpreted shallow anomalies. The sensitivity map can be computed via a computer simulation that includes an exploding simulated source at the target reflector in a reference earth model, with simulated receivers disposed at potential source and receiver locations, and the repeatability sensitivity map being computed by noting the magnitude of the spatial variations associated with timing and amplitude of the wave field at the source or receiver datum.

Figure 9:
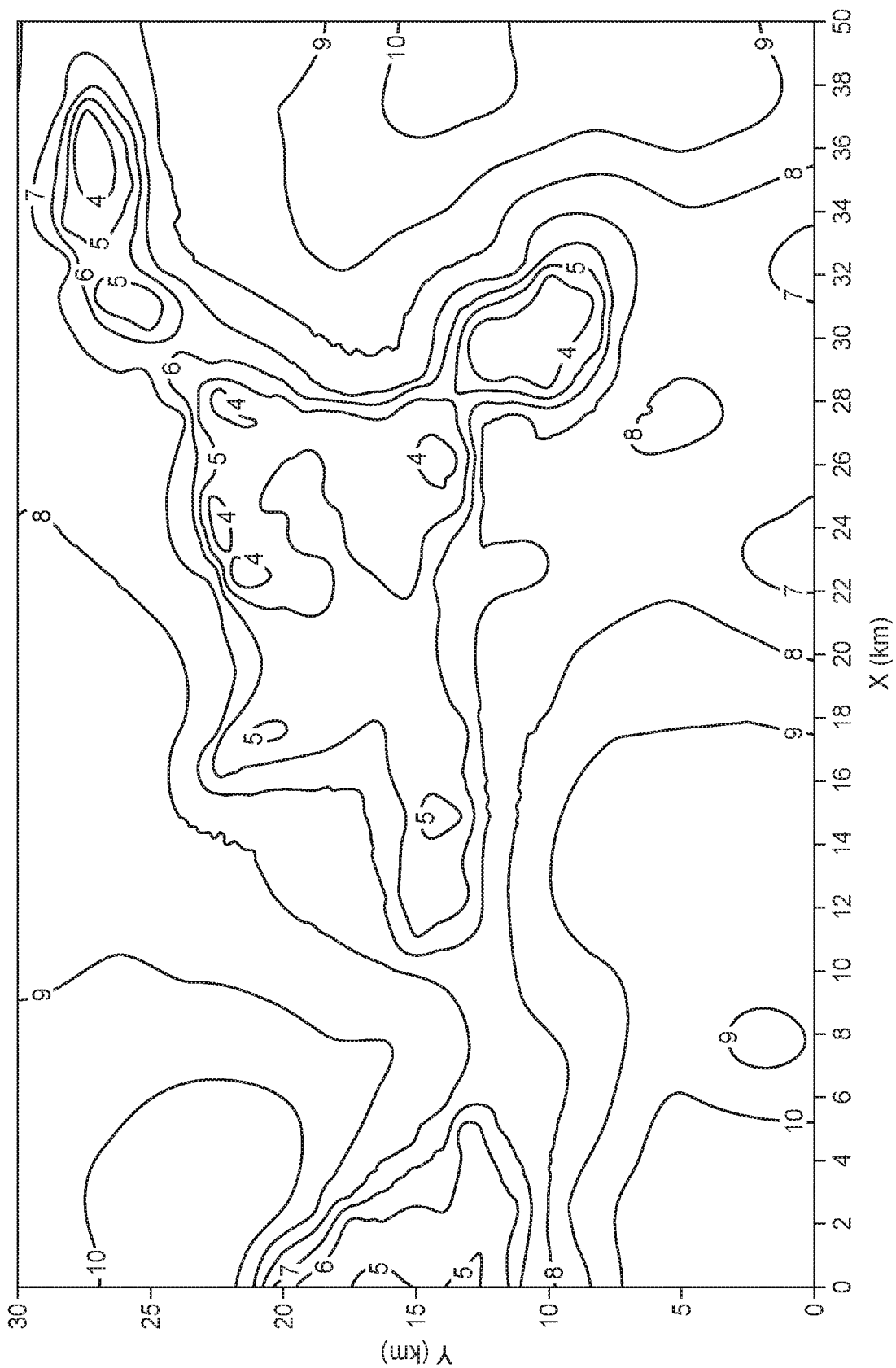
FIG. 9 illustrates an example of a map of tolerances.

FIG. 9 illustrates an example of the sensitivity map or map of tolerances generated in step 604. Step 604 can generate a contour map of allowable source and receiver repeatability requirements over the area for a seismic survey (the numbers 1, 2, 3, 4, 5, 6, 7, 8, 9, and 10 in FIG. 9 illustrate contours with the same tolerance). Where the contours show a region with repeatability tolerance of 4 m or less, then the 4D acquisition design needs to get source and receiver locations for the time-lapse survey to within 4 m of the corresponding locations for the monitor survey. Where the contours show a region within an allowable 8 m tolerance, then the acquisition design needs to get source and receiver locations for the time-lapse survey to within 8 m of the corresponding locations for the monitor survey.

Figure 7:
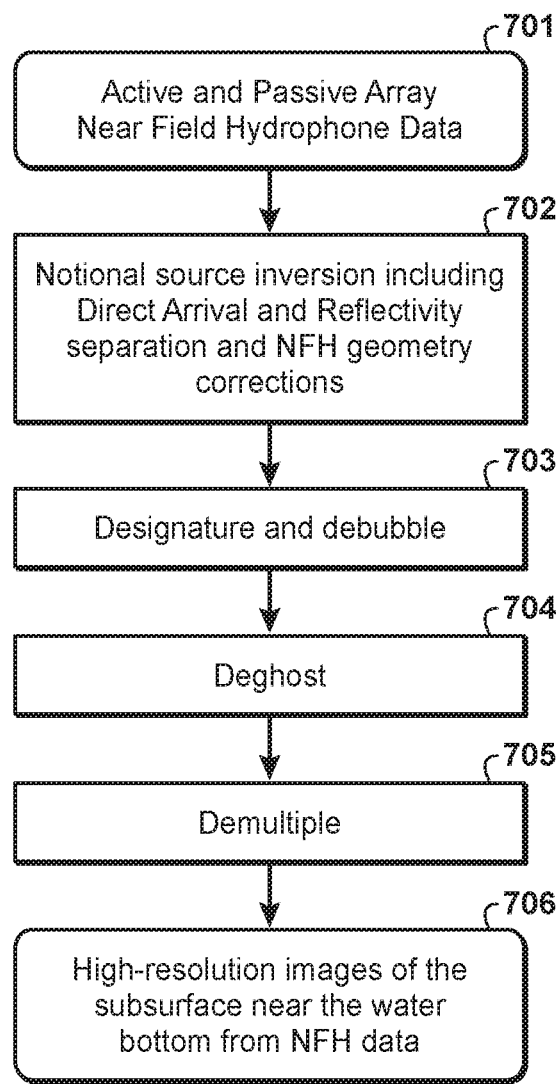
FIG. 7 illustrates an exemplary flow chart describing how near-field-hydrophone data can be processed to create accurate high-resolution images near the water bottom.

FIG. 7 illustrates an exemplary flow chart describing how near-field-hydrophone data can be processed to create accurate high-resolution images near the water bottom. In step 701, active and passive array near field hydrophone data are obtained. Step 702 can include notional source inversion, including direct arrival and reflectivity separation and NFH geometry corrections.

Method for Notional Source Inversion

Near-field hydrophones record the signals from all the active air guns. Based on this idea, Ziolkowski et al. (1982) and Parkes et al. (1984) proposed that the superposition of the direct and reflected waves from N air gun sources can be combined to create the predicted pressure field at any near-field hydrophone.

For fixed source and receiver locations, the pressure response $p_i(\omega)$ at the $i^{th}$ near-field hydrophone would be the sum of the responses due to N air guns, each with notional source $g_i(\omega)$ at location $(x_j, y_j, z_j)$. The origin for the vertical z axis is taken to be sea surface. Then the distance between the $j^{th}$ source and the $i^{th}$ near-field hydrophone is $r_{ij}$ and the distance between the $j^{th}$ ghost source and the $i^{th}$ near-field hydrophone is taken to be $p_{ij}$.

$$r_{ij} = \sqrt{(x_i-x_j)^2+(y_i-y_j)^2+(z_i-z_j)^2}$$

$$\rho_{ij} = \sqrt{(x_i-x_j)^2+(y_i-y_j)^2+(z_i+z_j)^2} \qquad (1)$$

Using the method of images, the near-field hydrophone pressure is straightforward to compute at receiver $d_i$. The velocity of sound in water is denoted by c. The sea surface reflectivity is taken to be $R_s(\omega, \beta, h)$ and is negative one at zero frequency.

$$d_i(\omega) = \sum_{j=1}^{N} g_j(\omega) \left\{ \frac{e^{i\omega r_{ij}/c}}{r_{ij}} + R_s(\omega, \beta, h) \frac{e^{i\omega \rho_{ij}/c}}{\rho_{ij}} \right\} \qquad (2)$$

A common model for the sea surface reflectivity as a function of the sea state h (which is specified in meters), the angular frequency $\omega$, and the cosine of the reflection angle relative to the sea surface $\beta$ is given below (Equation 3). A variation on this model for sea surface reflectivity includes an additional scale factor denoted by gamma with a value slightly less than one (such as a value of gamma equal to 0.995). The locations of each ghost source relative to each near-field hydrophone receiver are known, so the cosine of the angle of the sea surface reflection for each source ghost term can be computed. Ziolkowski did not consider dependencies on the sea state, the angular frequency, or the cosine of the sea surface reflection angle for the sea surface reflectivity. He simply used a number close to minus one.

$$R_s(\omega, \beta, h) = -\gamma e^{-2\left(\frac{h\beta\omega}{2.83c}\right)^2} \quad (3)$$
$$\gamma = 1$$

Firing an air gun generates an air bubble that rises in the water with velocity $v_{bubble}$ over time to reach sea surface. The bubble velocity is close to vertical and is dependent upon the size of the air gun's high pressure chamber with bubbles generated by large chamber volumes rising faster than bubbles generated by smaller chamber volumes. Consequently the equation below has a subscript j on the $v_{bubble}$ parameter. A near-field hydrophone moves with the velocity of the tow vessel or $v_{boat}$ over time in the x direction. Therefore if $x_i$ and $z_j$ are redefined to be the x location of the near-field hydrophone at zero time and the vertical location of the source at zero time respectively, these distance terms have the following temporal dependencies.

$$r_{ij}(t) = \sqrt{(x_i + v_{boat}t - x_j)^2 + (y_i - y_j)^2 + (z_i - z_j + (v_{bubble})_j t)^2} \quad (4)$$
$$\rho_{ij}(t) = \sqrt{(x_i + v_{boat}t - x_j)^2 + (y_i - y_j)^2 + (z_i + z_j + (v_{bubble})_j t)^2}$$

Given the temporal dependencies of the distance terms between the sources and receivers, perhaps it is better to write out the response as a convolution in the time domain using the delta function notation.

$$d_i(t) = \sum_{j=1}^{N} g_j(t) * \left\{ \frac{\delta(t - r_{ij}(t)/c)}{r_{ij}(t)} + R_s(t, \beta, h) * \frac{\delta(t - \rho_{ij}(t)/c)}{\rho_{ij}(t)} \right\} \quad (5)$$

Traditionally, marine acoustic sources are measured in units of bar-meters. A bar-meter is defined to be the number of bars of pressure that is measured by a pressure sensor located one meter away from a source. The choice of a reference distance, $r_{ref}$, to be one meter is arbitrary. The monopole acoustic Green's function suggests an amplitude of one and the associated time delay of 1 meter divided by the velocity of water for a reference receiver located one meter away from a notional source.

$$g'(t) = \frac{g\left(t - \frac{r_{ref}}{c}\right)}{r_{ref}} \quad (6)$$

If the notional source g(t) at the true source location is redefined in terms of g'(t), the pressure recorded a reference distance away from the true source location, then the equation above must be modified as follows.

$$g(t) = g'\left(t + \frac{r_{ref}}{c}\right)(r_{ref}) \quad (7)$$

Then the notional source g'(t) and the recorded hydrophone data d(t) have the same units of pressure. Ziolkowski's formulation has been modified so that the reference distance for each air gun can vary. This flexibility is needed to match the geometry variations observed in marine seismic acquisition geometries.

$$d_i(t) = \sum_{j=1}^{N} g_j'\left(t + \frac{(r_{ref})_j}{c}\right)(r_{ref})_j * \quad (8)$$
$$\left\{ \frac{\delta(t - r_{ij}(t)/c)}{r_{ij}(t)} + R_s(t, \beta, h) * \frac{\delta(t - \rho_{ij}(t)/c)}{\rho_{ij}(t)} \right\}$$

Therefore, the Ziolkowski-style inversion problem of interest is to estimate the notional sources g'(t) given the near-field hydrophone pressure data d(t) and all of the pertinent geometry information for the acquisition configuration. Ziolkowski simplifies this problem to a Gauss-Seidel style solution method by taking $R_s$ to be a constant and by assuming that the only near-field hydrophone receiver locations available are one meter away from each source location. Then, the following recursion formula can be iterated to get a solution.

$$g_i'(t) = \frac{d_i(t)}{(r_{ref})_i} - \sum_{\substack{j=1 \\ j \neq i}}^{N} g_j'(t) \frac{(r_{ref})_j}{(r_{ref})_i} * \quad (9)$$
$$\left\{ \frac{\delta(t - r_{ij}(t)/c + (r_{ref})_j/c)}{r_{ij}(t)} + R_s \frac{\delta(t - \rho_{ij}(t)/c + (r_{ref})_j/c)}{\rho_{ij}(t)} \right\}$$

The initial value for each g'$_i$(t) can be set to the original near-field hydrophone data d$_i$(t) to start the recursion.

This seemingly simple formula typically converges quickly, but not necessarily to a desired solution because of the inaccurate geometry information. In the near-field of the source array, 0.5 m error could lead to a large residual behind the primary peak. It has been found that including a damping term λ term (0.5<λ<1) in the recursion formula sometimes helps to mitigate errors due to inaccurate geometry information.

$$g_i'(t) = \frac{d_i(t)}{(r_{ref})_i} - \lambda \sum_{\substack{j=1 \\ j \neq i}}^{N} g_j'(t) \frac{(r_{ref})_j}{(r_{ref})_i} * \quad (10)$$
$$\left\{ \frac{\delta(t - r_{ij}(t)/c + r_{ref}/c)}{r_{ij}(t)} + R_s \frac{\delta(t - \rho_{ij}(t)/c + r_{ref}/c)}{\rho_{ij}(t)} \right\}$$

In any case, new acquisition geometry designs may include more near-field hydrophone receivers than sources for each air gun array and therefore the present technological advancement can use an inversion algorithm that is different from Ziolkowski to account for the additional information available and to enable inversion for the desired geometry corrections. The notional source separation can be implemented either in the frequency or in the time domain. In the time domain, the implementation of time-dependent distances is straightforward, but it requires intensive time interpolation and can be more computationally expensive. In the frequency domain, on the other hand, the implementation of time-dependent distances is not straightforward, but the solution is purely linear algebra with zero bubble and vessel velocities, and is easy to solve. Therefore, the composite workflow is to first compute notional source separation in the frequency domain and then refine the solution via computations using more parameters in the time domain. First we can compute the initial notional source separation in the frequency domain by setting bubble velocity and vessel velocity to zero. Then the notional sources can be used as the initial guesses for the time-domain approach with non-zero bubble velocity and vessel velocity.

Additionally, available sea-state information is honored, and near-field hydrophone information from both the active and passive air gun arrays is included in the inversions. Streamer data can also be incorporated in the inversion if the instrument and hydrophone response differences for each receiver are understood and the instrumentation response of the near-field hydrophones and the streamer hydrophones can be made common.

Updating Source Array Geometry

A better solution to the geometry issue is straightforward: updating the geometry information during notional source separation. Niang et al. (2013) and Ni et al. (2014) proposed to use the passive near-field hydrophone array for the geometry information update by using an undisclosed optimization method.

The travel time information in seismic data is directly linked to the geometric information, which is the idea behind seismic tomography. Each near-field hydrophone receiver records the energy emitted from all the active air guns for a single shot. For a near-field hydrophone picking the arrival times from individual active air gun sources is impossible except for the air gun that is typically one meter below an active NFH. But each string of active air guns will result in a peak in each near-field hydrophone record, which is easy to pick. By minimizing the picked peak time and modeled peak time, the geometric information can be updated. An assumption could be made to further simplify the problem: air guns only deviate in the cross-string direction from their nominal locations. This assumption is mostly true because of the mechanical configuration of the air gun array fixes the distance between air guns in the in-string direction. The angles and distances between air gun strings commonly vary as the seismic acquisition vessel moves through the water.

One complicating factor that may occur in some geologic settings is gas bubbles seeping into the water or near-surface fresh water channels. When that happens, the water velocity is greatly reduced and travel times are lengthened due to the changes in water velocity. More often, any larger or smaller travel times between the active and passive gun arrays are due to changes in the separation distance rather than changes in water velocity. Changes in the water velocity are typically monitored by placing velocimeters in the streamer cables or in the air gun source arrays. This measured velocity information can be used to identify traveltime variations that are due to changes in the velocity of sound in water.

A second complication is the true firing times of air guns can vary from shot-to-shot. This is especially true for large volume air guns which can typically vary as much as and sometimes more than ±1 ms from the aiming point. The method described inherently takes this variability into account and can utilize firing time information provided by the air gun controller. Just as the method accommodates unplanned air gun timing errors, it can also accommodate intentional firing time delays used when multiple sources are fired in a programmed sequence for simultaneous marine source acquisition.

All of the near-field hydrophones should be used during the geometry updating including both the active and passive air gun arrays, in order to take full advantage of the information contained in the data. Incorporating additional near-field hydrophone receivers between air gun array positions and/or between the air gun strings can also help constrain an inversion for both notional sources and air gun array positioning. Moreover, the geometry updating could be automatic if the real geometry does not deviate too much from the nominal geometry. In this case, a windowed cross-correlation between real data and modeled data could be used to extract the travel time differences for each peak generated by each string of air guns, which are then minimized to update the source array geometry.

Step 703 includes designaturing and debubbling the data. This can be accomplished with a suitable designature operator and a suitable debubbling filter, which are known to those of ordinary skill in the art and are included in commercially available data processing software packages.

Step 704 includes deghosting the data. For NFH data, de-ghosting can be designed as a deterministic 1D receiver-side de-convolution process, for the trace number is small and the offset is quite rigid. If the instrument responses for NFH and streamer are known, then the difference between instrument responses could be removed by a de-convolution process and then a convolution process. However, this doesn't guarantee that the resulted amplitude is true as the NFH traces have undergone stacking processes. An extra constraint comes from the deep reflection data in both NFH traces and streamer data. The smallest missing offset for streamer data is about 100 meters, which might result in a large amplitude variation with offset (AVO) response difference for shallow reflected waves across the offset, but little AVO response difference for deep reflected waves. Therefore, the deep reflection events can be indicators for designing the spectrum shaping filter. By comparing the deep reflection events, the amplitude of zero- and nearly-zero-offset traces can be correctly constrained. For streamer data in ultra-shallow environment, the direct wave is mixed with reflections and hard to remove using conventional processing methods. With the notional sources derived as discussed above, we can model the direct waves at sensor sets locations in the streamers. Then an adaptive subtraction can be used to remove the direct wave from streamer data. Preservation of accurate AVO responses can be important as anomalous AVO responses are often associated with hydrocarbon accumulations in some geologic environments and therefore AVO may be used for hydrocarbon prospecting.

Step 705 includes removing multiples from the data. This can be done with a SWD (shallow water demultiple) technique and/or SRME (surface related multiple elimination) technique for multiple prediction and elimination; both of which are known to those of ordinary skill in the art.

Step 706 includes generating high-resolution images of the subsurface near the water bottom from the processed NFH data.

EXAMPLE

One embodiment of the proposed innovative method for defining 4D source and receiver repeatability standards will be given. This does not limit the present technological advancement to only this embodiment.

Figure 8:
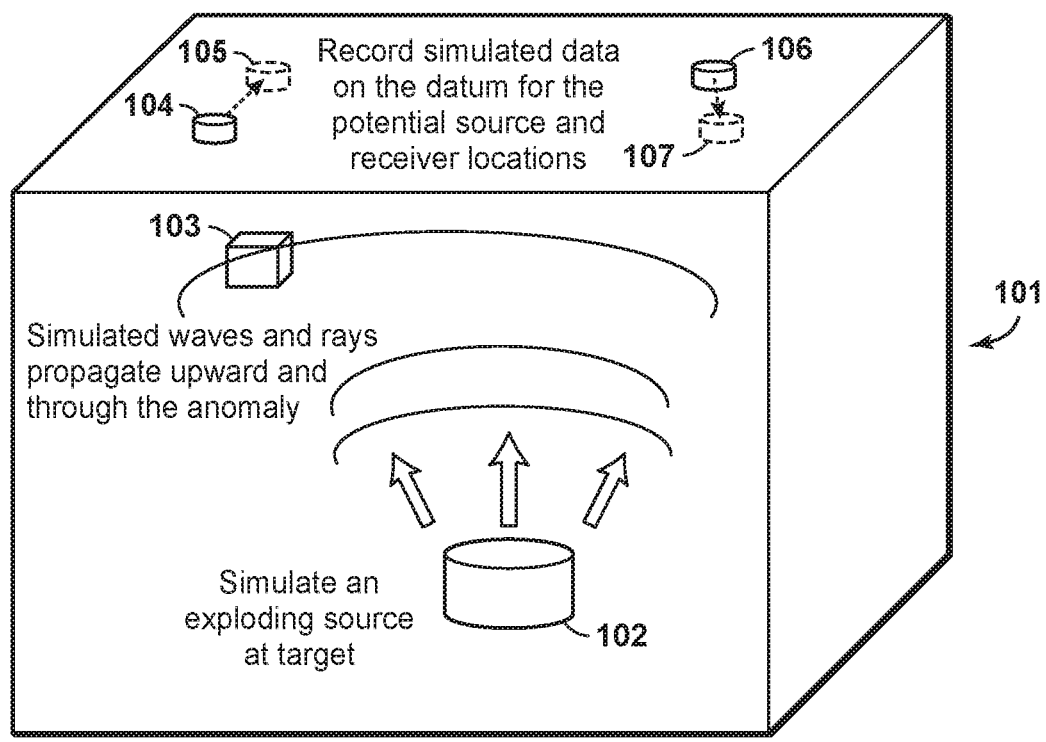
FIG. 8 illustrates a simulation to predict variations in the source and receiver locations.

Given an earth model, simulated Green's function responses can be estimated between the reservoir target zone and the datum where the source and receivers are to be placed. This process is described in FIG. 8. FIG. 8 illustrates a simulation to predict variations in the source and receiver locations. Given an earth model (generated through conventional means) with interpreted background properties and interpreted shallow anomalies from the high-resolution images, a computer simulation can be done to predict the sensitivity of small variations in the source and receiver locations. The simulation can include one or more exploding sources at locations associated with the target reservoir. The waves or rays can be upwardly propagated through the background medium and the near surface anomalies. The simulated data can be recorded on the datum where the potential source and receiver locations are to be specified. Usually the source and receiver locations are on a datum, such as 6 m below mean sea level. The present technological advancement can account for perturbations of the seismic vessel in location horizontally and/or vertically. Where the simulated data vary the most rapidly in timing and amplitude information is where the tightest 4D source and receiver repeatability requirements should be specified.

The Green's functions can be used to create simulated data that can be analyzed using traditional 4D repeatability quality control tools. This is done by convolving the Green's function that goes from the target to the source with the Green's function that goes from the target to the receiver. Green's functions can be computed via 3D ray tracing, beam methods, or wave equation simulation methods.

Various authors including Kragh and Christie (2002), Cantillo (2012), and Lecerf et al (2015) propose quantitative quality control measures for determining whether or not seismic data from a base survey and a monitor survey are sufficiently repeatable. The NRMS method from Kragh and Christie is the most commonly used measure. When the simulated data generated fail the source and receiver repeatability quality control tests due to small perturbations for the source and receiver locations, the 4D seismic repeatability specifications must be adapted. A map of the survey is adjusted and the resulting 4D seismic repeatability specifications can vary over the survey based upon the geology that observed. In other words, the 4D source and receiver repeatability specifications can be varied over the survey based upon the interpretation of the shallow anomalies with high effort to ensure repeatability is only specified where needed.

The following embodiment is one of many possible embodiments. Historically, the industry has prior 4D surveys in simple geology for which repeatability specifications have been defined. That can define a reference repeatability tolerance value. One key repeatability test can be based upon timing differences for the simulation due to small source or receiver perturbations within that tolerance. When the average timing difference exceeds a threshold set at roughly one-fourth of a wavelength at the highest frequency of interest (or another reference frequency) for the 4D study, then the repeatability tolerance should drop to half of the original tolerance. This process can be repeated to ultimately define a map of repeatability tolerances appropriate for the entire survey.

Let the original Green's function source amplitude as a function of location and event time be s(x,y,z,t) and the time-lapse perturbed Green's function source amplitude as a function of location and event time be s'(x',y',z',t').

$$x'=x+\Delta x$$

$$y'=y+\Delta y$$

$$z'=z+\Delta z$$

$$t'=t+\Delta t$$

Usually $\Delta z$ is very small as depth positioning errors are usually better controlled than horizontal positioning errors, although variation in sea level due to tides and sea state and water temperature can have an impact. Those effects are commonly called "water column statics" and are addressed by other methods. This innovative method focusses on the timing and illumination issues caused by subsurface anomalies and horizontal positioning differences.

The importance of a timing error $\Delta t$ is large if the timing error exceeds one-fourth of a wavelength for the highest frequency of interest in a seismic image denoted by $f_{max}$.

$$\Delta t_{threshold} = \frac{1}{4 f_{max}}$$

For a high-resolution images, $f_{max}$ would be greater than 75 Hz.

The present technological advancement can also be used in the management of hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Furthermore, once the present technological advancement determines the repeatability tolerances, then the monitor survey can be conducted utilizing the map of repeatability tolerances.

Computer Implementation

Figure 10:
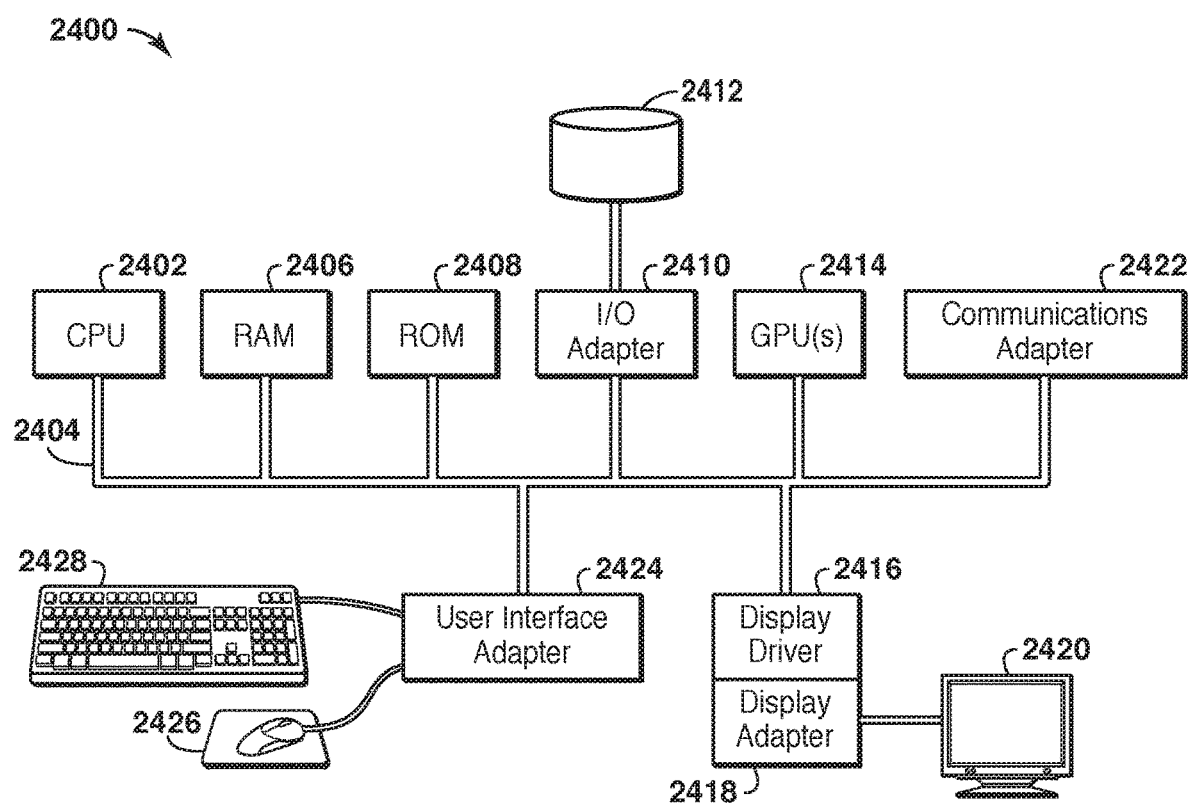
FIG. 10 is an exemplary computer system that can implement the present technological advancement.

FIG. 10 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 10, additional CPUs may be present. Moreover, the computer system 2400 may comprise a networked, multi-processor computer system that may include a hybrid parallel CPU/GPU 2414 system. The CPU 2402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 2400. The display adapter 2418 is driven by the CPU 2402 to control the display driver 2416 and the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The foregoing application is directed to particular embodiments of the present technological advancement for the purpose of illustrating the present technological advancement. It will be apparent, however, to one skilled in the art, that many modifications and variations to the embodiments described herein are possible. All such modifications and variations are intended to be within the scope of the present invention, as defined in the appended claims.

REFERENCES

The following references are hereby incorporated by reference in their entirety:

John E. Anderson, Haiyang Wang, Young Ho Cha, and Michael W. Norris, 2016, Method To Estimate And Remove Direct Arrivals From Arrayed Marine Sources, U.S. Patent Application 62/309,062, filed Mar. 16, 2016;

Cantillo, Juan, 2012, Throwing a new light on time-lapse technology, metrics and 4D repeatability with SDR: The Leading Edge, 31, 405-413;

Johnston, D. H., R. S. McKenny, J. Verbeek, and J. Almond, 1998, Seismic time-lapse analysis of Fulmar field: The Leading Edge, 17, no. 10, 1420-1428;

Johnston, D. H., J. E. Eastwood, J. J. Shyeh, R. Vauthrin, M. Khan, and L. R. Stanley, 2000, Using legacy seismic data in an integrated time-lapse study: Lena field, Gulf of Mexico: The Leading Edge, 19, no. 3, 294-302;

Johnston, D. H., and B. P. Laugier, 2012, Resource assessment based on 4D seismic and inversion at Ringhorne field, Norwegian North Sea: The Leading Edge, 31, no. 9, 1042-1048;

Johnston, D. H., 2013, Practical Applications of Time-Lapse Seismic Data, SEG Distinguished Instructor Series No. 16, Society of Exploration Geophysicists;

Kragh, E., and P. Christie, 2002, Seismic repeatability, normalized rms, and predictability: The Leading Edge, 21, 640-647;

Didier Lecerf, Jon Burren, Ed Hodges, Caio Barros, 2015, Repeatability measure for broadband 4D seismic, SEG Expanded Abstracts;

Michael W. Norris, 2010, Zero Offset Profile From Near-field Hydrophones, U.S. Pat. No. 8,964,502;

J. G. F. Stammeijer, P. J. Hatchell, 2014, Standards in 4D feasibility and interpretation, The Leading Edge;

Haiyang Wang, John Anderson, Michael Norris, and Young Ho Cha, 2016, Uses of near-field hydrophone measurements for shallow-water imaging and demultiple, SEG Expanded Abstracts;

Baumstein A. and R. Neelamani, 2010. Accurate data reconstruction through simultaneous application of statistical and physics-based constraints to multiple geophysical data sets. GEOPHYSICS, 75(6), WB165-WB172;

Baumstein, Anatoly and Remesh Neelamani, 2013, Method for analyzing multiple geophysical data sets, U.S. Pat. No. 8,352,190 B2;

Brac, 1986, Method And Device For Determining The Remote Emission Signature Of A Seismic Emission Assembly, U.S. Pat. No. 4,827,456;

Brink, M., Sabel, P., Eidsvig, S. and Kolbjorsen, K., 1999, The value of near field hydrophone measurements for monitoring source signature variations, EAGE 61st Conference Expanded Abstracts, session 6-09;

Dragoset, B., 2000, Introduction to air guns and air-gun arrays: The Leading Edge, 19, 892-897;

Hegna, S., 2008, Method for detecting air gun faults in a marine seismic source array, US PTO 20080175102;

Hegna, 2014, Estimation Of Direct Arrival Signals Based On Predicted Direct Arrival Signals And Measurements, US20150234071;

Hoogeveen, 2006, System And Method For Determining Positions Of Towed Marine Source-array Elements, U.S. Pat. No. 7,539,079;

Hopperstad, 2006, Methods And Systems For Determining Signatures For Arrays Of Marine Seismic Sources For Seismic Analysis, U.S. Pat. No. 7,440,357;

Hopperstad, J. F., and Laws, R., 2006, Source Signature Estimation-Attenuation of the Seafloor Reflection Error in Shallow Water: EAGE Expanded Abstract;

Hopperstad, 2009, Position Determination Of A Seismic Source Array, U.S. Pat. No. 8,605,551;

Hopperstad, 2009, Position Determination Of A Seismic Source Array, U.S. Pat. No. 8,687,462;

Laws, 2008, Using Source Elevation Measurements To Remove Sea Perturbations, US20090073804;

Laws, 2010, Determination Of Notional Signatures, US20120072115;

Keers, 2008, Acquiring Near Zero Offset Survey Data, U.S. Pat. No. 8,467,264;

Keers, 2013, Acquiring Near-zero Offset Survey Data, US20130279291;

Kragh, E., R. Laws and A. Ozbek, 2000, Source Signature Estimation—Attenuation of the sea-bottom reflection error from near-field measurements: EAGE Expanded abstract;

Kragh, 2007, Zero-offset Seismic Trace Construction, U.S. Pat. No. 8,958,266;

Mott-Smith, 1973, Multiple Air Gun Array Of Varied Sizes With Individual Secondary Oscillation Suppression, U.S. Pat. No. 3,893,539;

Newman, 1986, Underwater Seismic Testing, U.S. Pat. No. 4,693,336;

Ni, Y., T. Payen, and A. Vesin, 2014, Joint inversion of near-field and far-field hydrophone data for source signature estimation: SEG, Expanded Abstracts;

Ni. Y., F. Haouam and R. Siliqi, 2015, Source signature estimation in shallow water surveys: SEG Expanded abstract;

Niang, C., Ni, Y. and Svay, J, 2013, Monitoring of Air-Gun Source Signature Directivity: SEG Expanded Abstracts;

Norris, 2010, Zero Offset Profile From Near-field Hydrophones, U.S. Pat. No. 8,964,502;

Parkes, G. E., A. Ziolkowski, L. Hatton, and T. Haugland, 1984, The signature of an airgun array: computation from near-field measurements including interactions—Practical considerations: Geophysics, 49, 105-111;

Parkes, 2004, Method Of Seismic Source Monitoring Using Modeled Source Signatures With Calibration Functions, U.S. Pat. No. 7,218,572;

Sheriff, R. E., Geldart, L. P. (1995). Exploration Seismology (2nd ed.). Cambridge University Press. p. 86. ISBN 0-521-46826-4;

Yang, 2008, Measuring Far Field Signature Of A Seismic Source, U.S. Pat. No. 8,917,573; Ziolkowski, 1981, Determination Of Far Field Signatures, For Instance Of Seismic Sources, U.S. Pat. No. 4,476,550;

Ziolkowski, A. and Johnston, R., 1997, Marine seismic sources: QC of wavefield computation from near-field pressure measurements, Geophysical Prospecting, 45, 611-639;

Ziolkowski, A., 1998, Measurement of air-gun bubble oscillations: Geophysics, 63, 2009-2024; and Ziolkowski, 1988, Method Of Accumulation Data For Use In Determining The Signatures Of Arrays Of Marine Seismic Sources, U.S. Pat. No. 4,868,794.

What is claimed is:

1. A method for designing 4-D seismic acquisition source and receiver repeatability specifications, said method comprising:
    locating, with a computer, subsurface anomalies above a target reservoir zone from analysis of high-resolution reflectivity images for the target reservoir zone;
    determining a size, location, and contrast of the anomalies;
    determining, with a computer, how the anomalies above the target reservoir zone modify target illumination for variations in the 4-D seismic acquisition source and receiver positions, wherein the determining comprises estimating, from the size, location and contrast of the anomalies with respect to a surrounding medium, which areal source or receiver surface positions would be impacted by the anomalies, magnitude of reflectivity of the anomalies, magnitude of timing and amplitude differences for wave propagation through the anomalies compared to wave propagation away from the anomalies, and a solid angle illumination impairment range associated with the anomalies relative to the target reservoir zone; and
    determining, with a computer, repeatability specifications for a monitor seismic survey, wherein tolerances for the source or receiver positions vary across an acquisition area based on how the anomalies modify the target illumination.

2. The method of claim 1, wherein the high-resolution reflectivity images are derived from a site hazard survey.

3. The method of claim 1, wherein the high-resolution reflectivity images are derived from a combination of active and passive arrays of near field hydrophone data.

4. The method of claim 1, wherein the high-resolution reflectivity images are derived from small-offset data associated with variable reluctance transducer source placed near a head or tail of marine streamer cables and streamer receivers disposed near the variable reluctance transducer.

5. The method of claim 1, wherein the determining repeatability specifications includes generating a sensitivity map associated with the anomalies via a computer simulation of an exploding simulated source at a target reflector in a reference earth model, with simulated receivers disposed at potential source and receiver locations, and the sensitivity map is generated from magnitude of spatial variations associated with timing and amplitude of the wave field at the source or receiver locations.

6. The method of claim 1, further comprising conducting a monitor survey in accordance with the repeatability specifications.

7. A non-transitory computer readable storage medium encoded with instructions, which when executed by a computer causes the computer to implement a method for designing 4-D seismic acquisition source and receiver repeatability specifications, said method comprising:
    locating, with the computer subsurface anomalies above a target reservoir zone from analysis of high-resolution reflectivity images for the target reservoir zone;
    determining a size, location, and contrast of the anomalies;
        determining, with the computer, how the anomalies above the target reservoir zone modify target illumination for variations in the 4-D seismic acquisition source and receiver positions, wherein the determining comprises estimating, from the size, location and contrast of the anomalies with respect to a surrounding medium, which areal source or receiver surface positions would be impacted by the anomalies, magnitude of reflectivity of the anomalies, magnitude of timing and amplitude differences for wave propagation through the anomalies compared to wave propagation away from the anomalies, and a solid angle illumination impairment range associated with the anomalies relative to the target reservoir zone; and
    determining, with the computer, repeatability specifications for a monitor seismic survey, wherein tolerances for the source or receiver positions vary across an acquisition area based on how the anomalies modify the target illumination.

* * * * *